(12) United States Patent
Imai

(10) Patent No.: US 9,201,536 B2
(45) Date of Patent: Dec. 1, 2015

(54) TOUCH-SENSITIVE VEHICLE DISPLAY DEVICE

(71) Applicant: CALSONIC KANSEI CORPORATION, Saitama (JP)

(72) Inventor: Chihaya Imai, Saitama (JP)

(73) Assignee: CALSONIC KANSEI CORPORATION, Saitama (JP)

( * ) Notice: Subject to any disclaimer, the term of this patent is extended or adjusted under 35 U.S.C. 154(b) by 11 days.

(21) Appl. No.: 14/279,510

(22) Filed: May 16, 2014

(65) Prior Publication Data

US 2014/0350784 A1    Nov. 27, 2014

(30) Foreign Application Priority Data

May 21, 2013    (JP) .................................. 2013-107199

(51) Int. Cl.
*G06F 3/041* (2006.01)

(52) U.S. Cl.
CPC .................................... *G06F 3/0412* (2013.01)

(58) Field of Classification Search
None
See application file for complete search history.

(56) References Cited

U.S. PATENT DOCUMENTS

| | | | | |
|---|---|---|---|---|
| 6,801,855 | B1* | 10/2004 | Walters et al. | 701/410 |
| 8,374,777 | B2* | 2/2013 | Reich | 701/409 |
| 2002/0055872 | A1* | 5/2002 | LaBrie et al. | 705/14 |
| 2007/0143018 | A1* | 6/2007 | Murlidar et al. | 701/220 |
| 2010/0088030 | A1* | 4/2010 | Stephens et al. | 701/220 |

FOREIGN PATENT DOCUMENTS

JP    2007-76384    3/2007

* cited by examiner

*Primary Examiner* — Rami Khatib
(74) *Attorney, Agent, or Firm* — Wenderoth, Lind & Ponack, L.L.P.

(57) ABSTRACT

A touch-sensitive vehicle display device is disclosed. The touch-sensitive vehicle display device comprises a body having a display including a touch panel on a surface thereof, whereby a screen operation is performed on the surface of the display by a touch-screen operation; an operation plate provided along the surface of the display; and a controller controlling information to be indicated on the display. The operation plate includes an opening section to indicate a switch provided to face the touch panel, and a plurality of touch-sensitive switch-confirmation portions provided on an end portion of the opening section for switch indication, and the controller controls a switch-indication portion to be inside the opening section to indicate switching in the display, and controls a plurality of selection-switches to be in the switch-indication portion to correspond to the plurality of switch-confirmation portions.

7 Claims, 21 Drawing Sheets

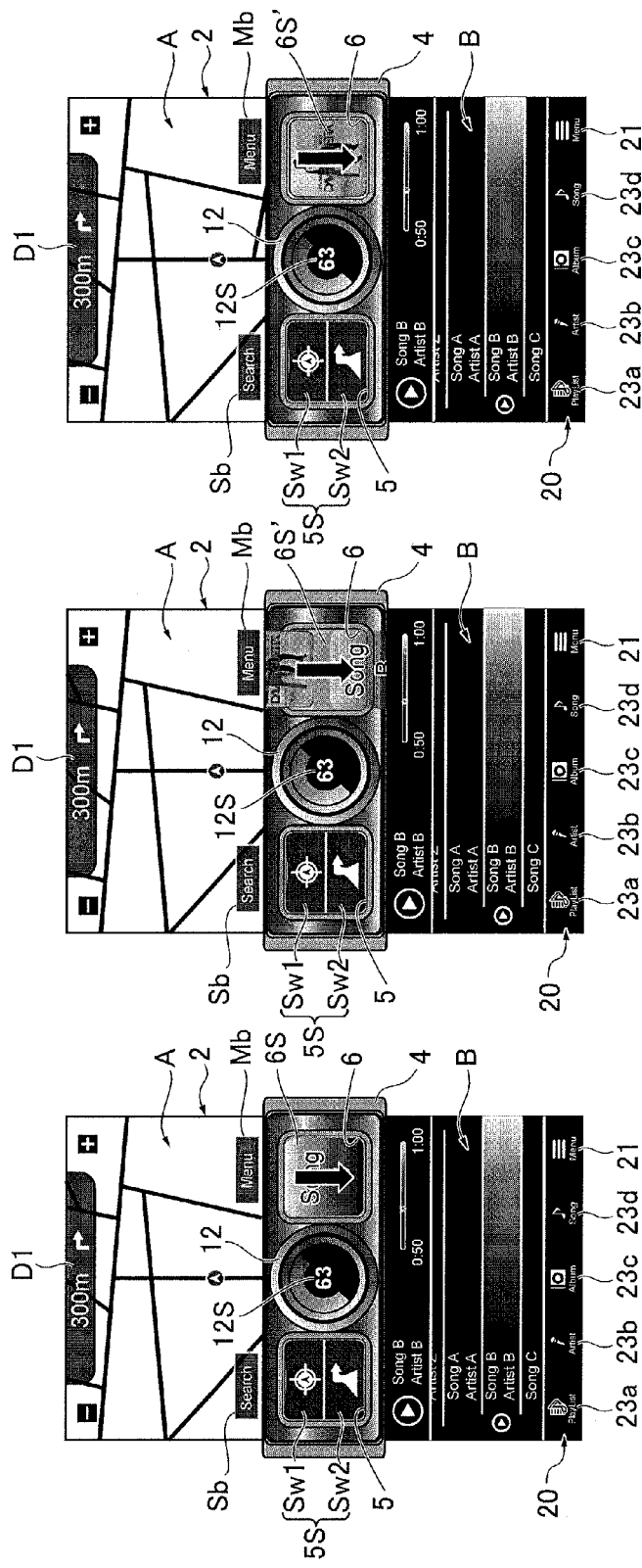

TOUCH-SENSITIVE VEHICLE DISPLAY DEVICE

CROSS-REFERENCE TO RELATED APPLICATION

The present application is based on and claims priority from Japanese Patent Application No. 2013-107199, filed on May 21, 2013, the disclosure of which is hereby incorporated by reference herein in its entirety.

BACKGROUND

Field of the Invention

The present invention relates to a touch-sensitive vehicle display device which is capable of being operated by a touch-screen operation.

As such display devices, for example, a vehicle display device shown in JP2007-76384A is known. The vehicle display device disclosed therein includes a first monitor provided with a first screen which indicates visible information and a second touch-sensitive monitor provided with a second screen which indicates information for operating the visible information indicated on the first screen.

In such a vehicle display device, a number of switches or operation buttons are indicated on the second monitor. A plurality of switches or buttons is selected by a touch-sensitive operation so that visible information which corresponds to the selected and operated switch or button is indicated on the first screen of the first monitor.

However, in such a vehicle display device, it is difficult to accurately operate the target switch or button without looking at the second display screen of the second monitor, so low performance is inevitable in the operation during the driving of the vehicle.

SUMMARY

An object of the present invention aims to provide a touch-sensitive vehicle display device in which a target switch can be selected accurately from a plurality of switches without looking at a display screen even while the vehicle is being driven.

In order to accomplish the above-described object, a touch-sensitive vehicle display device according to the Embodiments of the present invention includes a body having a display including a touch panel on a surface thereof, whereby a screen operation is performed on the surface of the display by a touch-screen operation; an operation plate provided along the surface of the display; and a controller controlling information to be indicated on the display. The operation plate includes an opening section to indicate a switch provided to face the touch panel, and a plurality of touch-sensitive switch-confirmation portions provided on an end portion of the opening section for switch indication. The controller controls a switch-indication portion to be inside the opening section to indicate switching in the display, and controls a plurality of selection-switches to be in the switch-indication portion to correspond to the plurality of switch-confirmation portions.

BRIEF DESCRIPTION OF THE DRAWINGS

The accompanying drawings are included to provide further understanding of the invention, and are incorporated in and constitute a part of this specification. The drawings illustrate embodiments of the invention and, together with the specification, serve to explain the principle of the invention.

FIGS. 10A, 10B and 10C are explanatory views illustrating a button indicating a cover jacket when music is selected as content.

DETAILED DESCRIPTION OF THE PREFERRED EMBODIMENT

Hereinafter, embodiments of a touch-sensitive vehicle display device according to the present invention will be described with reference to the drawings.

Embodiment 1

Figure 1:
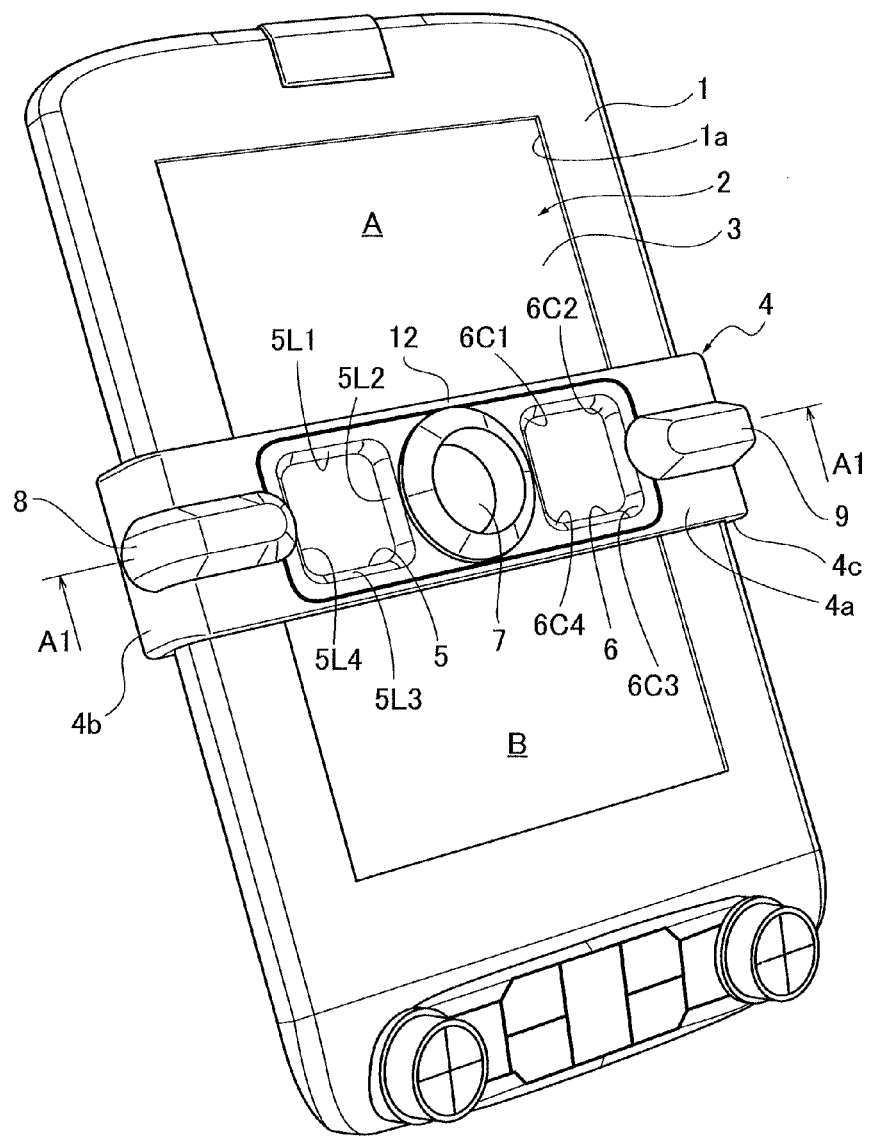
FIG. 1 is a perspective view illustrating a touch-sensitive vehicle display device according to Embodiment 1 of the present invention.
Figure 2:
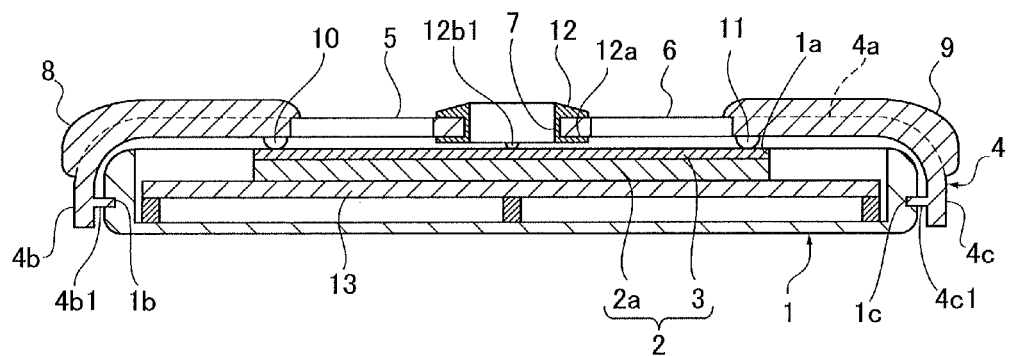
FIG. 2 is a cross-sectional view of the touch-sensitive vehicle display device shown in FIG. 1 along A1-A1 line.
Figure 3:
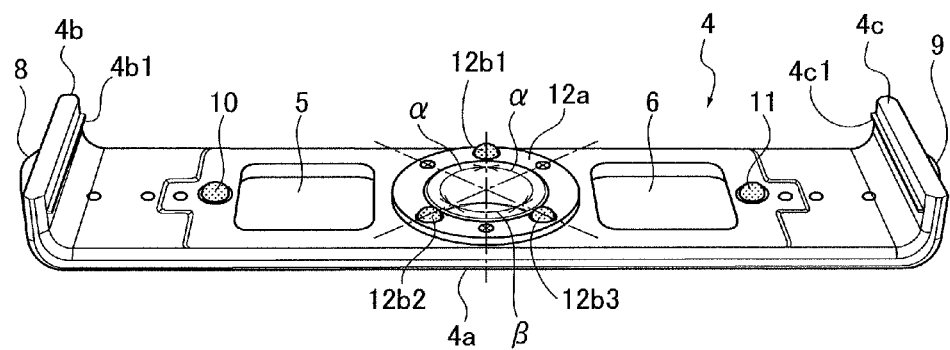
FIG. 3 is a perspective view illustrating a rear side configuration of a sliding plate in the touch-sensitive vehicle display device shown in FIG. 1.
Figure 4:
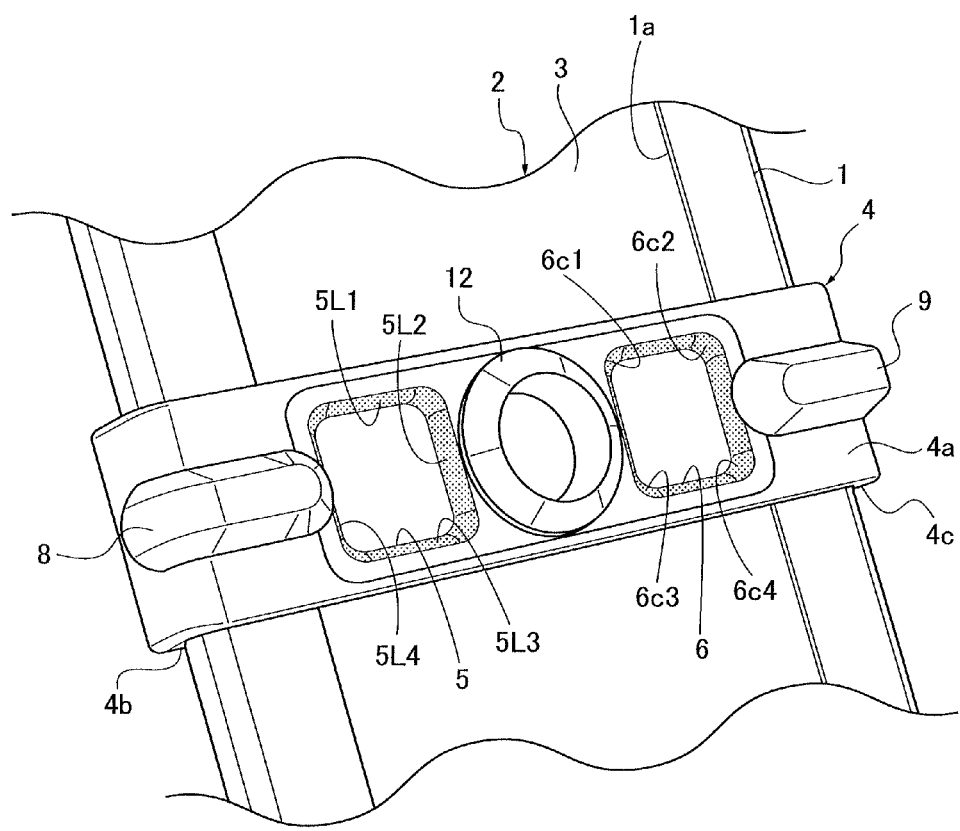
FIG. 4 illustrates an enlarged view of the sliding plate in the touch-sensitive vehicle display device shown in FIG. 1.

FIG. 1 is a perspective view of a touch-sensitive vehicle display device according to Embodiment 1 of the present invention. FIG. 2 is a cross-sectional view of the touch-sensitive vehicle display device shown in FIG. 1 along A1-A1 line. FIG. 3 is a perspective view illustrating a rear side configuration of a sliding plate of the touch-sensitive vehicle display device shown in FIG. 1. FIG. 4 is an enlarged view of the sliding plate in the touch-sensitive vehicle display device shown in FIG. 1.

The touch-sensitive vehicle display device shown in FIG. 1 is installed around a driving sheet or on an instrument panel of a vehicle. The touch-sensitive vehicle display device includes a case body (body) 1 having an opening section 1a and an information display 2 provided in the opening section 1a. The information display 2 includes, as shown in FIG. 2, a liquid crystal display 2a which is held in the case body 1, and a touch panel 3 (touch-sensitive panel) which is provided on the surface of the liquid crystal display 2a. In the touch panel 3, screen operation is executed by a touch-screen operation.

The touch-sensitive vehicle display device includes a sliding plate 4 (operation plate) which is attached to the case body 1 so that it can move up and down along the surface of the information display 2. The sliding plate 4 is composed of a conductive material such as aluminium. The sliding plate 4 includes a surface plate 4a along the touch panel 3 and side plates 4b and 4c disposed on both sides of the surface plate 4a (refer to FIGS. 1, 3, and 4), as shown in FIG. 2.

In Embodiment 1, guiding grooves 1b and 1c which extend longitudinally are provided on the side section of the case body 1, as shown in FIG. 2. Engagement claws 4b1 and 4c1 are also provided on internal surfaces of the side plates 4b and 4c of the sliding plate 4. By engaging the engagement claws 4b1 and 4c1 to the guiding grooves 1b and 1c, the surface plate 4a of the sliding plate 4 is attached to the case body 1 so that it can move along the surface of the information display 2 (surface of touch panel 3). In this respect, another configuration is also possible, whereby engagement plates are provided on the side plates 4b and 4c so as to have contact with the rear surface of the case body 1. Thereby, the sliding plate 4 can move on the rear surface and side surface of the case body 1 as a guide.

Figure 7:
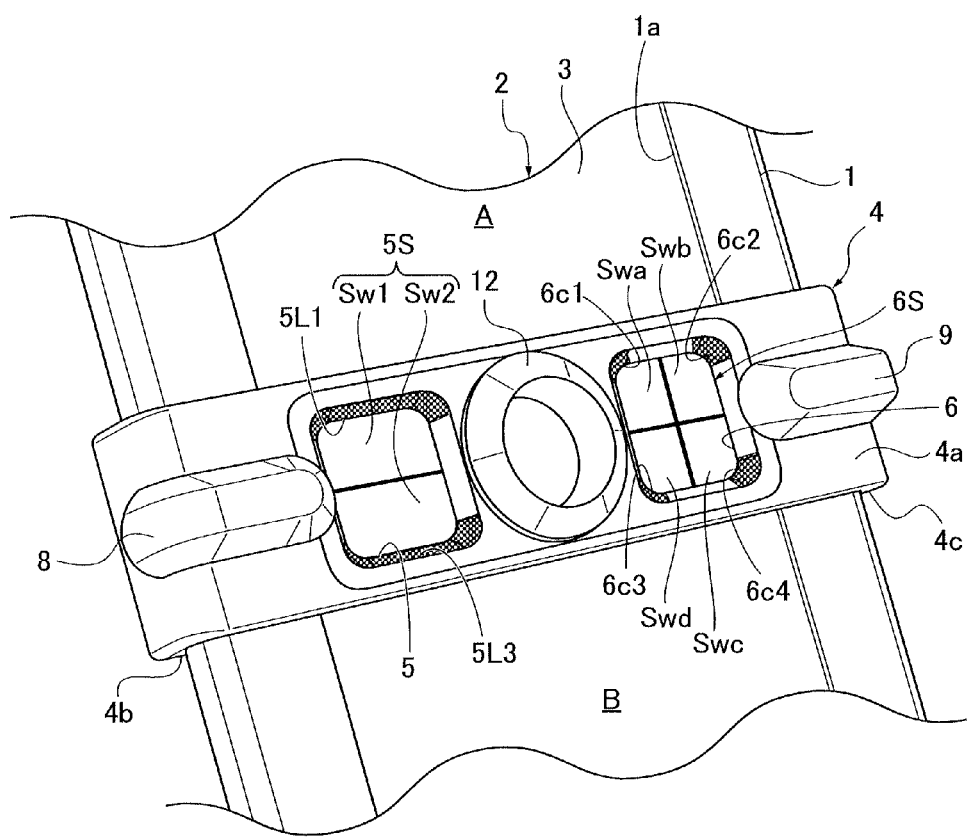
FIG. 7 illustrates an enlarged view of an opening section to indicate a switch which is provided in the sliding plate shown in FIG. 1.

Square (quarry) opening sections 5 and 6 indicating a switch are formed on the left and right sides of the surface plate 4a so as to face the information display 2. An opening section 7 for holding a dial shown in FIG. 2 is formed in the center portion of the surface plate 4a. As shown in FIGS. 1, 4 and 7, side sections 5L1 to 5L4 of the opening section 5 and corner sections 6C1 to 6C4 of the opening section 6 are provided as touch-sensitive switch-confirmation portions. An operating protrusion 8 which extends from the end portion of the opening section 5 to the side plate 4b, and an operating protrusion 9 which extends from the end portion of the opening section 6 to the side plate 4c are formed on both sides of the sliding plate 4. In FIGS. 8 to 22, the operating protrusions 8 and 9 are omitted from the sliding plate 4, for convenience.

In addition, position detectors (contact portions) 10 and 11 which contact the touch panel 3 are formed on right and left portions of the surface plate 4a on the sliding plate 4 as position-detecting means, as shown in FIGS. 2 and 3. The position detectors 10 and 11 are composed of hemispherical conductive rubber and have a point-contact with the touch panel 3.

The position detectors 10 and 11 are moved up and down on the touch panel 3 by sliding the sliding plate 4 up and down. Thus, the position detectors 10 and 11 detect the position of the sliding plate 4 in the vertical direction relative to the information display 2.

The opening section 7 on the sliding plate 4 is formed in a circle in which a ring-shape (circular) dial 12 is attached to be rotatable. The dial 12 includes a flange (circular plate) 12a facing the touch panel 3. A plurality of position detectors (contact portions) 12b1 to 12b3 are disposed on the flange 12a, as shown in FIG. 3. The position detector 12b1 contacts the touch panel 3, as shown in FIG. 2. Although not shown in the figures, the position detectors 12b2 and 12b3 contact the touch panel 3, similar to the position detector 12b1. The position detectors 12b1 to 12b3 are similarly composed of hemispherical conductive rubber and have a point-contact with the touch panel 3.

In addition, in the three position detectors 12b1 to 12b3, a disposing angle between the position detectors 12b1 and 12b2, and a disposing angle between the position detectors 12b1 and 12b3 have the same angle α. A disposing angle β between the position detectors 12b2 and 12b3 is narrower than the angle α between the position detectors 12b1 and 12b2 or 12b1 and 12b3. Thereby, the rotation position of the position detector 12b1 on the dial 12 can be detected.

Figure 5:
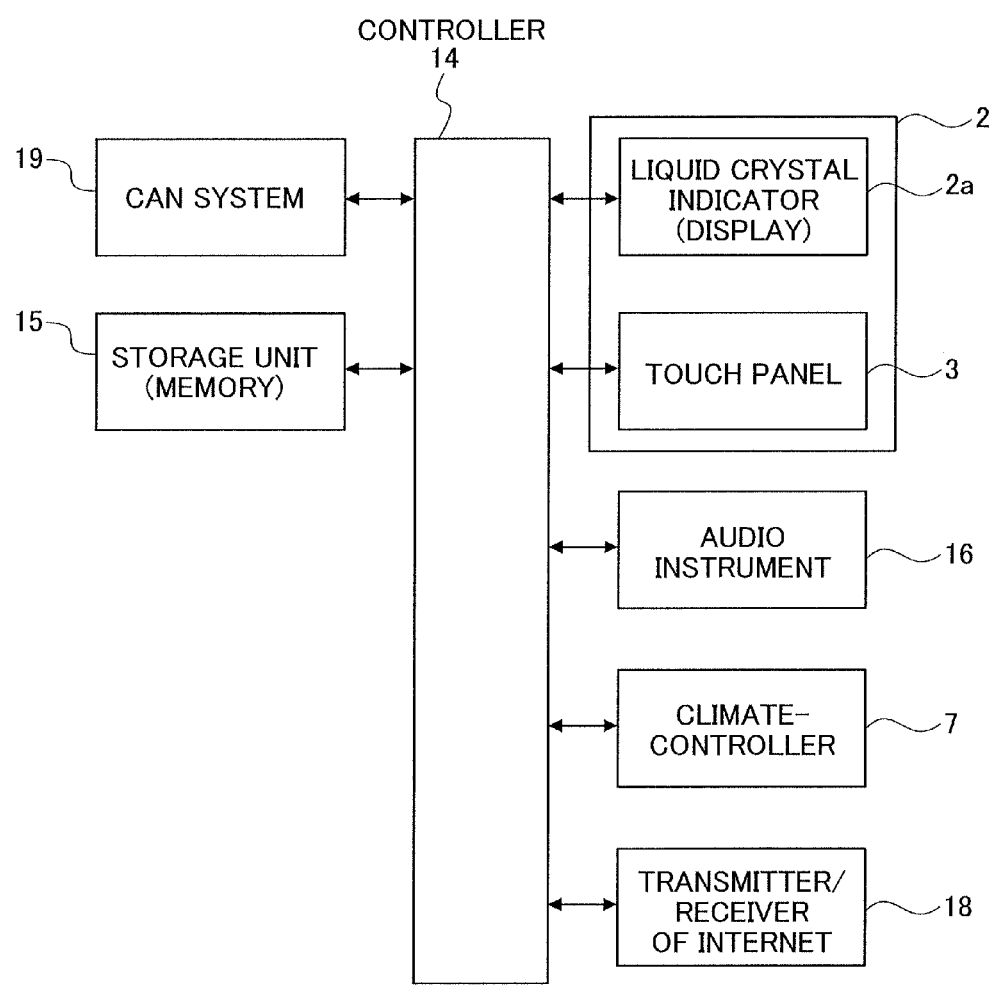
FIG. 5 is a control-circuit view of the touch-sensitive vehicle display device shown in FIG. 1.
Figure 6:
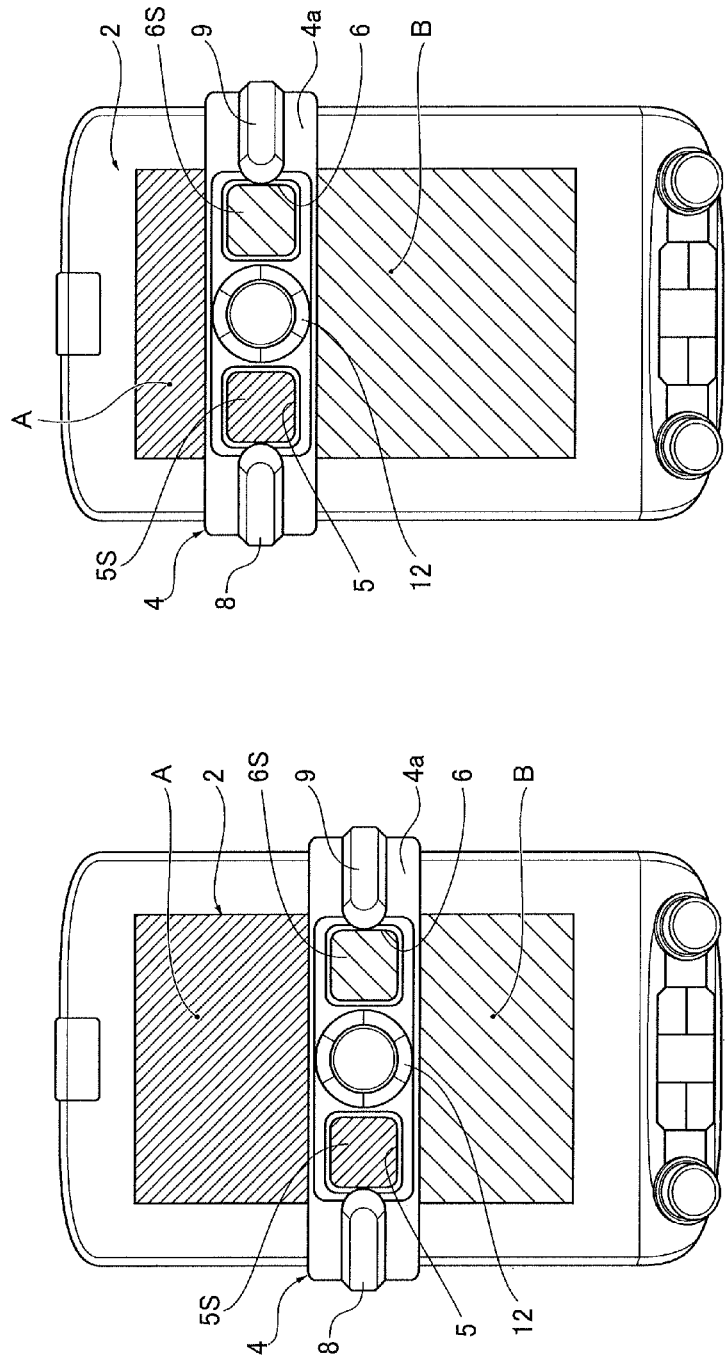
FIGS. 6A and 6B are explanatory views illustrating a moving operation of the sliding plate shown in FIG. 1 and a display range of content.

The liquid crystal display 2a is attached to the surface of a printed substrate 13 which is fixed inside the case body 1, as shown in FIG. 2. A controller 14 shown in FIG. 5 is disposed on the printed substrate 13. A memory 15 is connected to the controller 14, and signals from the liquid crystal display 2a, the touch panel 3, an audio instrument 16, a climate-controller 17, and a transmitter/receiver for the Internet 18 are input to the controller 14. Herein, the transmitter/receiver for the Internet 18 can be disposed inside the case body 1. Vehicle information is input to the controller 14 through a CAN system 19. Such vehicle information includes, for example, location information from a GPS antenna, a vehicle-speed signal from a speedometer, a revolution signal from a rev counter, and signals from each section of the climate controller.

For example, the controller 14 controls the display position of content A to the upper portion of the information display 2, and the display position of content B to the lower portion of the information display 2, relative to the position of the sliding plate 4 on the information display 2, according to a detected signal from the position detectors 10 and 11.

The positions of the position detectors 10 and 11 in the direction along the touch panel 3 are changed when the sliding plate 4 is moved up and down. The controller 14 detects the location of the position detectors 10 and 11 in the direction along the touch panel 3, according to a contact-signal from the touch panel 3. Thereby, a position of the sliding plate 4 on the information display 2 is obtained from the contact-signal, and the controller 14 changes display ranges of content A and content B corresponding to the position of the sliding plate 4.

Types of content A and content B include, for example, vehicle-navigation information, music, vehicle information, climate-control information, and an Internet browser. However, the types of content are not limited to the above.

Figure 8:
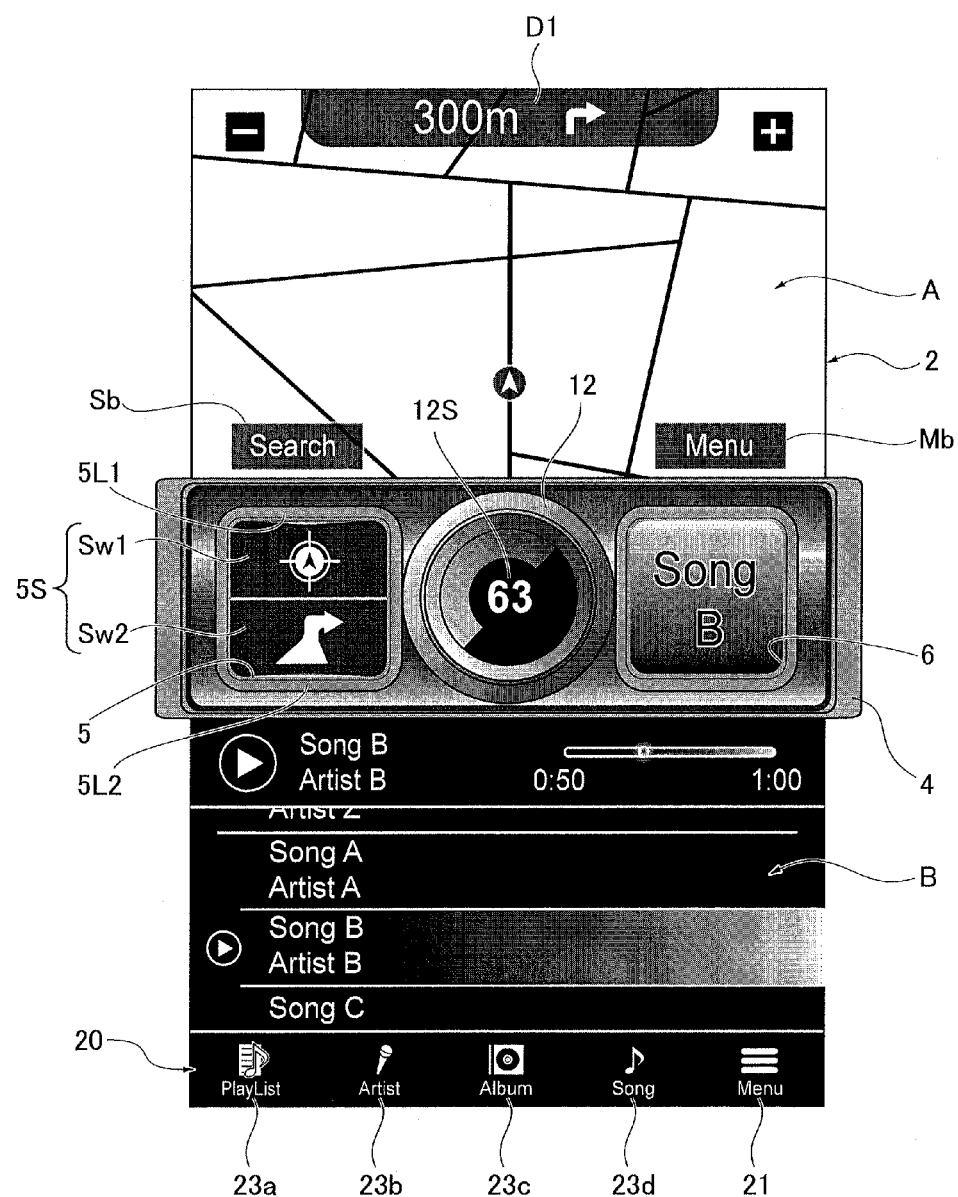
FIG. 8 is an explanatory view illustrating an example in which a vehicle navigation screen and a music list are displayed as content.

As content A, generally, a vehicle navigation screen (map screen) of a navigation map according to information obtained from the GPS and so on is displayed as shown in FIG. 8. On the lower left and lower right of the vehicle navigation screen, a "Search" button Sb for setting a destination and a "Menu" button Mb for setting detailed navigation are indicated adjacent to the upper edge of the sliding plate 4. The display positions of the "Search" button Sb and "Menu" button Mb can be moved with an up-and-down movement of the sliding plate 4, so as to maintain the desired position relative to the position of the sliding plate 4.

A simple-route indicator D1 is indicated on an upper center part of the vehicle navigation screen. In the route indicator D1, a distance from the present location to a next turning-point to right or left, and an arrow indicating the right or left turning-direction are indicated. A minus (−) button for scaling-down the map is provided on the upper left side of the vehicle navigation screen. A plus (+) button for enlarging the map is provided on the upper right side of the vehicle navigation screen. In this instance, the enlarging or scaling-down of the map can be similarly achieved by a pinch-in or pinch-out operation. On the vehicle navigation screen, the map can be viewed by touching the screen and scrolling up and down and from side to side.

Furthermore, in order to select and indicate the content A or content B on the information display 2, the controller 14 controls a content-indication field 20 to select content to be indicated in the lower end portion of the information display 2, as shown in FIG. 8.

Figure 9A:
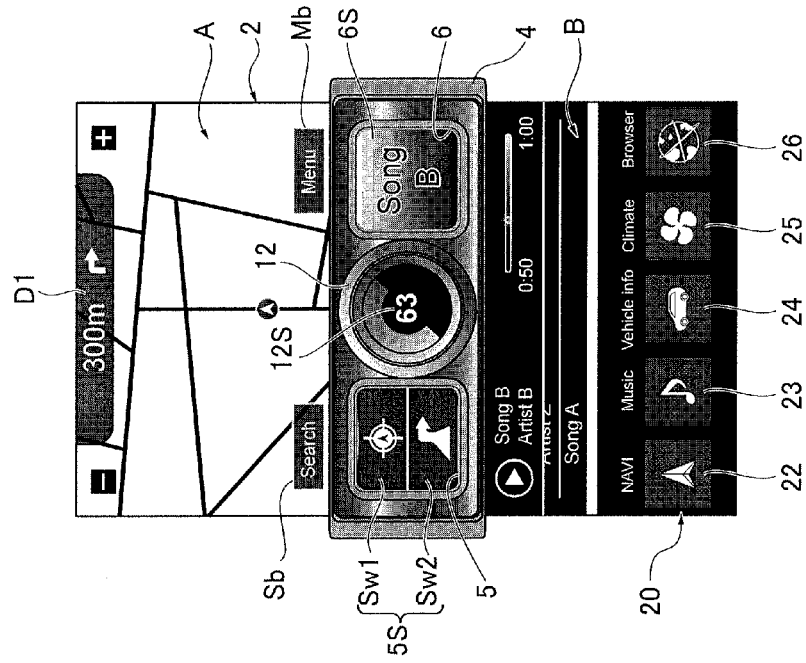
FIGS. 9A and 9B are explanatory views illustrating a screen which includes a content-indication field to select content on the lower side portion.
Figure 9B:
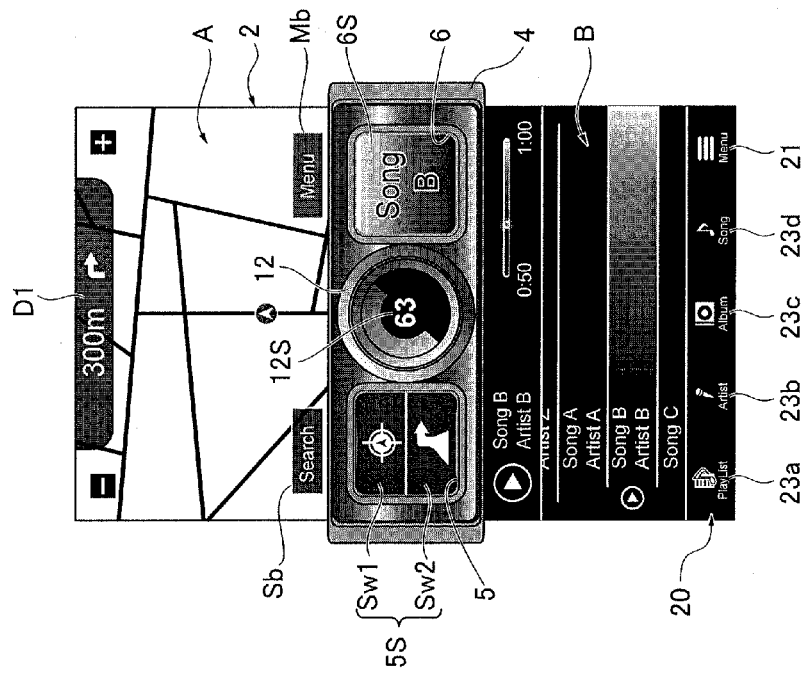

In Embodiment 1, when a menu button 21 in the content-indication field 20 is touch-operated, the content indicated in the content-indication field 20 is changed from that of the music category shown in FIG. 9A to that of the menu category shown in FIG. 9B, by the controller 14.

As shown in FIG. 9B, buttons to select content, such as a vehicle-navigation information button 22, music button 23, vehicle information button 24, climate-control button 25, and Internet browser button 26 are indicated on the content-indication field 20 from left to right in order. FIGS. 8 and 9A illustrate examples of the music-category content indicated in the content-indication field 20 when the music button 23 shown in FIG. 9B is operated by touch-operation.

According to Embodiment 1, as shown in FIG. 7, a switch-indication field (or button-indication field) 5S is provided in the opening section 5 of the information display 2. In the switch-indication field 5S, two (plural) selection-switches Sw1 and Sw2 are provided to correspond to a plurality of touch-sensitive switch-confirmation portions 5L1 and 5L3 in the sides of the switch-indication field 5S, by the controller 14.

As shown in FIG. 8, when the vehicle navigation screen is displayed as the content A, the selection switch Sw1 is provided to indicate the present location of the vehicle, and the selection switch Sw2 is provided to indicate the turning point to right or left.

(Button to Indicate Cover Jacket)

In Embodiment 1, as shown in FIG. 7, a switch-indication field 6S (or button-indication field) is provided inside the opening section 6 for switch indication on the liquid crystal indicator (display part) 2a. A plurality of selection switches Swa to Swd are provided to correspond to a plurality of (four) corner sections 6C1 to 6C4 in the switch-indication field 6S, by the controller 14. A plurality of (four) corner sections 6C1 to 6C4 are provided as a plurality of touch-sensitive switch-confirmation portions. In addition, switches other than the selection switches Swa to Swd can be also indicated in the switch-indication field 6S by a touch-operation or swipe-operation on the switch-indication field 6S. Hereinafter, display examples of the switch-indication field 6S and the content-indication field 20 in which music is selected for display will be described.

When the music category is selected as content B by operating the music button 23 shown in FIG. 9B, the controller 14 controls the content-indication field 20 to show menu-switches of music categories, as shown in FIG. 8 (refer to FIGS. 9A, 10A-10C, 11A, and 11B). As shown in FIG. 8, menu-switches of music categories include a switch 23a to indicate a list of favorites, a switch 23b to indicate a list collected by musicians, a switch 23c to indicate a record list, and a switch 23d to indicate the music list.

As shown in FIG. 8, the controller 14 controls the switch-indication field 6S to show a "Song B" button so that a cover jacket and so on are indicated (refer to FIGS. 9A, 10A-10C, 11A and 11B). By a touch-operation or swipe-operation of the "Song B" button in the switch-indication field 6S, a cover jacket to be indicated in the "Song B" button is selected.

Figure 11A:
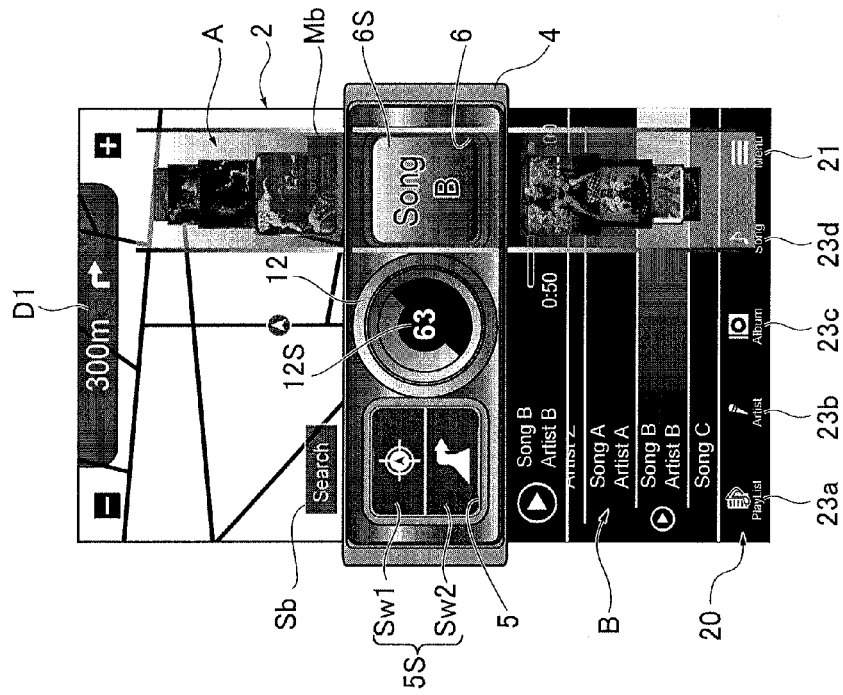
FIGS. 11A and 11B are explanatory views illustrating a liner list which is indicated in the button indicating a cover jacket when music is selected as content.
Figure 11B:
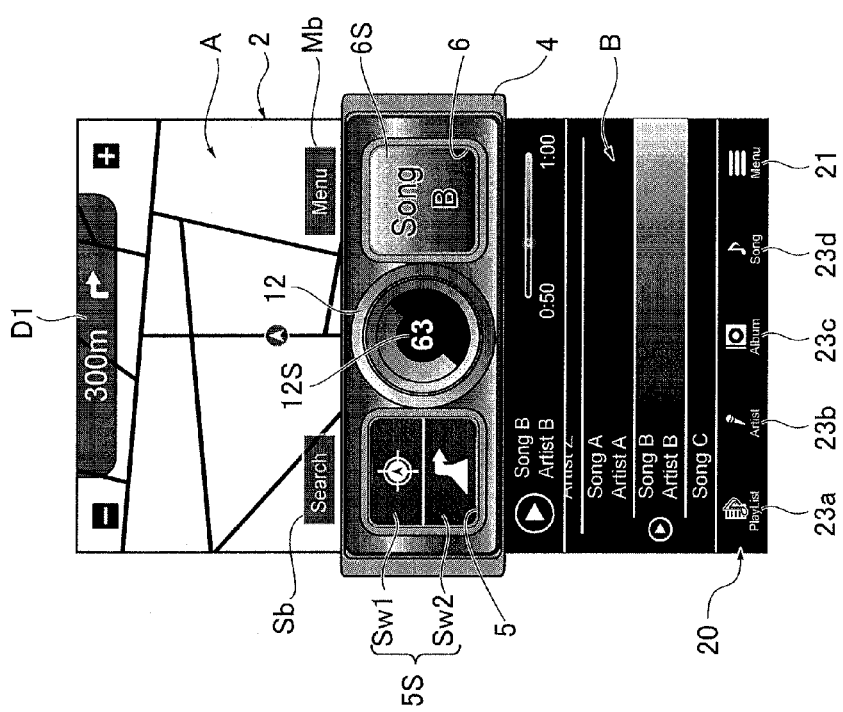

For example, when the "Song B" button in the switch-indication field 6S is touch-operated, the list of the cover jackets is indicated to expand on upper and lower sides in the information display 2 across the "Song B" button, as shown in FIG. 11B.

During the above-described operation, when the swipe-operation in the direction of a downward arrow shown in FIG. 10A (or direction opposite to the downward arrow) is executed on the "Song B" button, a cover jacket of the next (or previous) song is indicated in the switch-indication field 6S, as shown in FIGS. 10B and 10C.

Figure 12B:
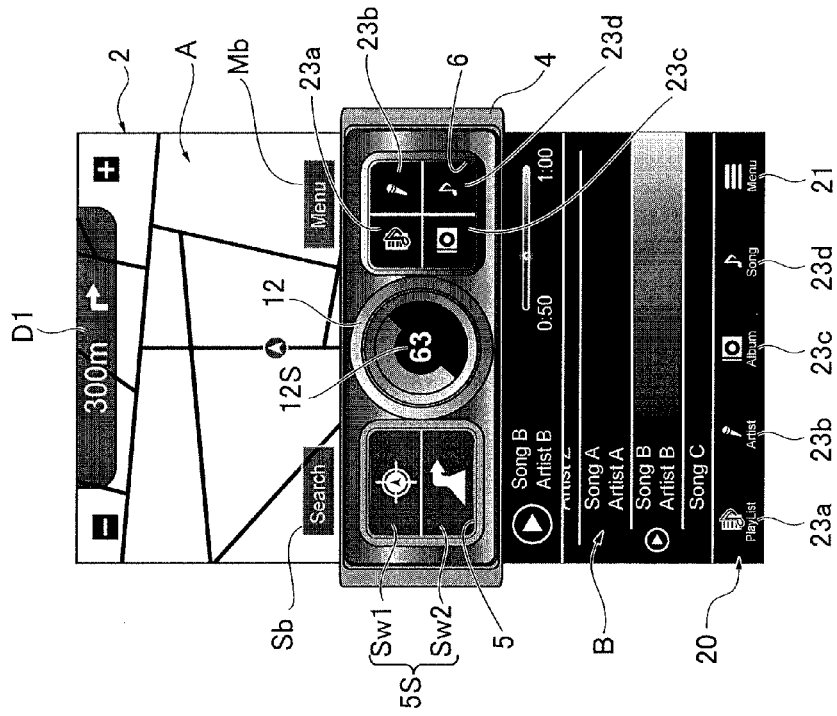
FIGS. 12A and 12B are explanatory views illustrating a selection switch which is indicated in a switch indicator when music is selected as content.
Figure 12A:
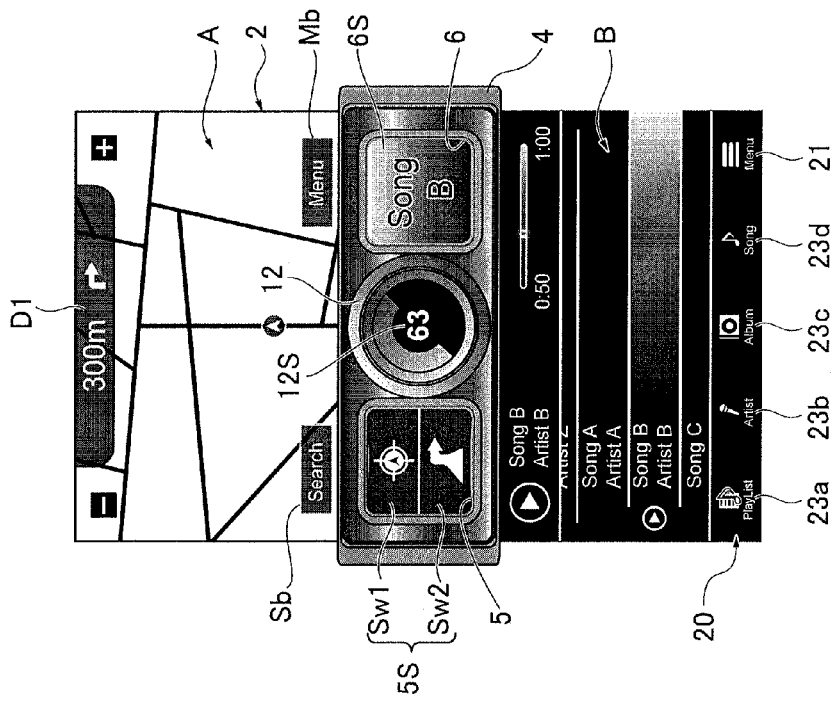

When the "Song B" button is held down for a few seconds (for example, for two seconds), the "Song B" button indicated in the switch-indication field 6S shown in FIG. 12A is changed to a switch shown in FIG. 12B. In this instance, the switch shown in the switch-indication field 6S in FIG. 12B is selected from category-menu switches of music shown in the content-indication field 20. The category-menu switches of music include the switch 23a to indicate a list of favorite records, switch 23b to indicate a list collected by musicians, switch 23c to indicate a record list, and switch 23d to indicate the music list.

Figure 13:
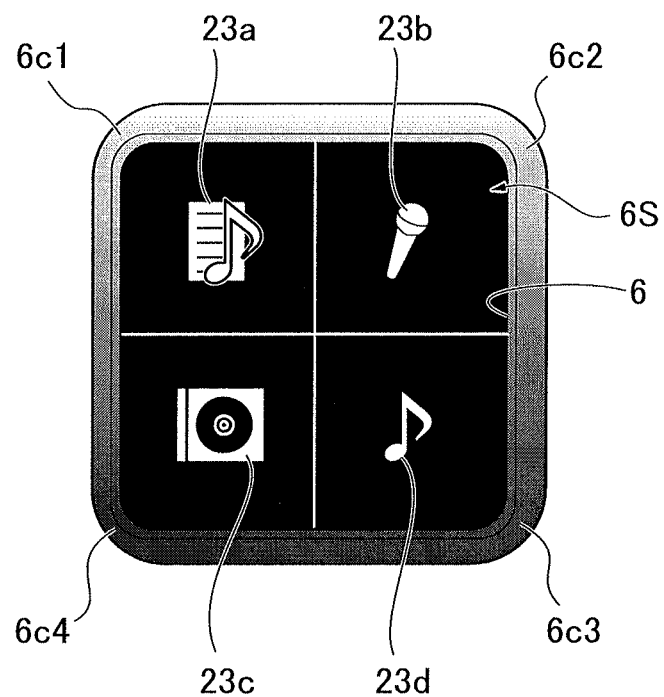
FIG. 13 illustrates an enlarged view of the selection switch shown in FIG. 12B.

The switches 23a to 23d are distributed in quarter divisions in the switch-indication field 6S, as shown in FIG. 13. The switches 23a to 23d are provided to correspond to the corner portions 6C1, 6C2, 6C3, and 6C4 as a plurality of touch-sensitive switch-confirmation portions. Accordingly, the operation of selecting the switches 23a to 23d can be performed accurately and simply by a touch-operation of the corner portions 6C1, 6C2, 6C3, and 6C4.

When music is selected as the content B, the controller 14 controls an indicator 12S in the dial 12 of the information display 2 to show a volume level. In the indicator 12S, the volume level is indicated in a volume indicator bar having a circular-arc shape and a numeral level.

The volume level (numeral level and length of volume indicator bar) can be increased or decreased by rotating the dial 12. That is, when the dial 12 rotates and the rotation position signal of the position detector 12b1 is input from the touch panel 3, the controller 14 calculates the position of the rotated dial 12 from the signal and controls the volume level (numeral level and length of volume indicator bar) up and down in accordance with the rotation position.

(Screen Showing Vehicle-Navigation Button)

Figure 14A:
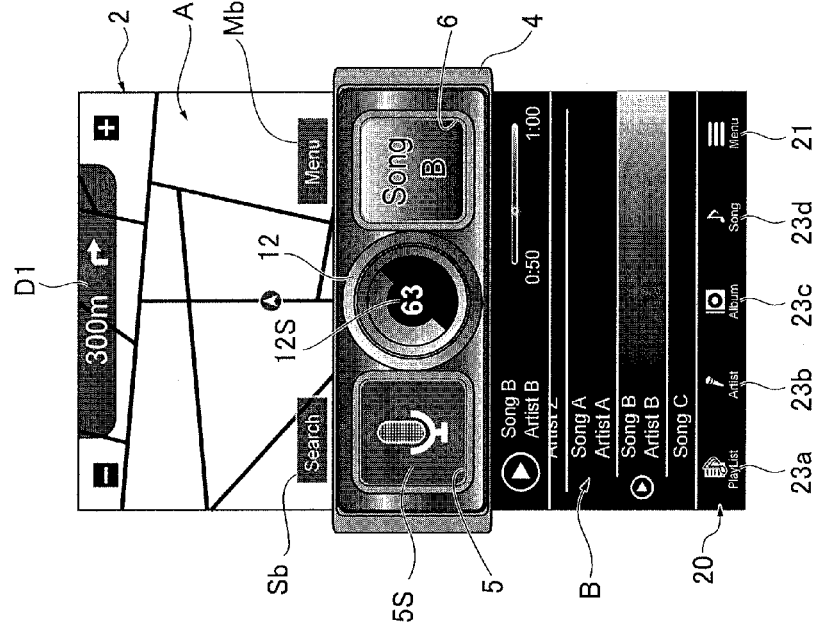
FIGS. 14A and 14B are explanatory views illustrating a voice-recognition button which is indicated in the switch indicator.
Figure 14B:
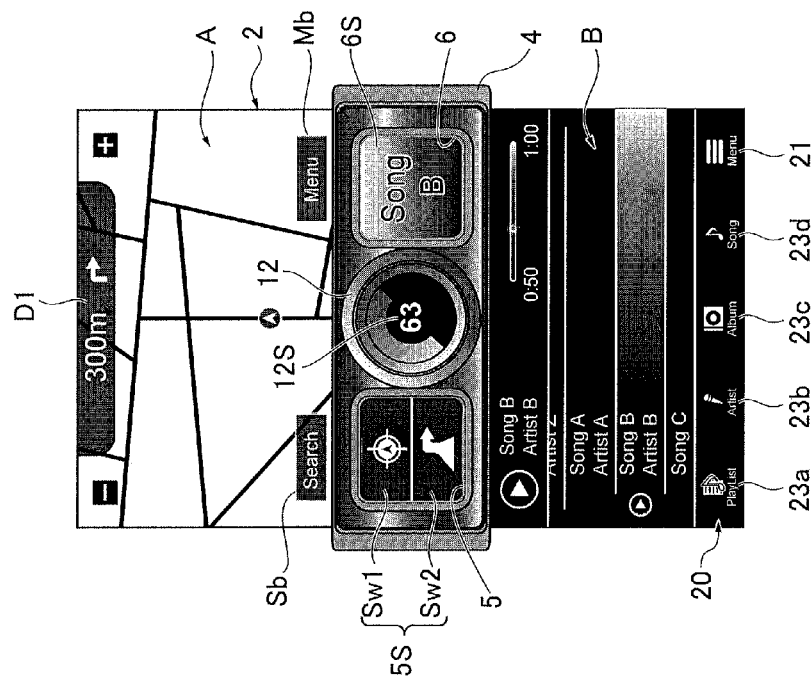

As shown in FIG. 14A, under the condition that the present location of the vehicle and the selection buttons Sw1 and Sw2 to indicate the next turning point to right or left are shown in the switch-indication field 5S of a vehicle-navigation button, if the switch-indication field 5S is held down for a few seconds (for example, two seconds), the voice-recognition button having a microphone picture is indicated in the switch-indication field 5S, as shown in FIG. 14B. In this instance, a destination search can be performed by a sound signal.

(Screen Showing Vehicle Information)

Figure 15:
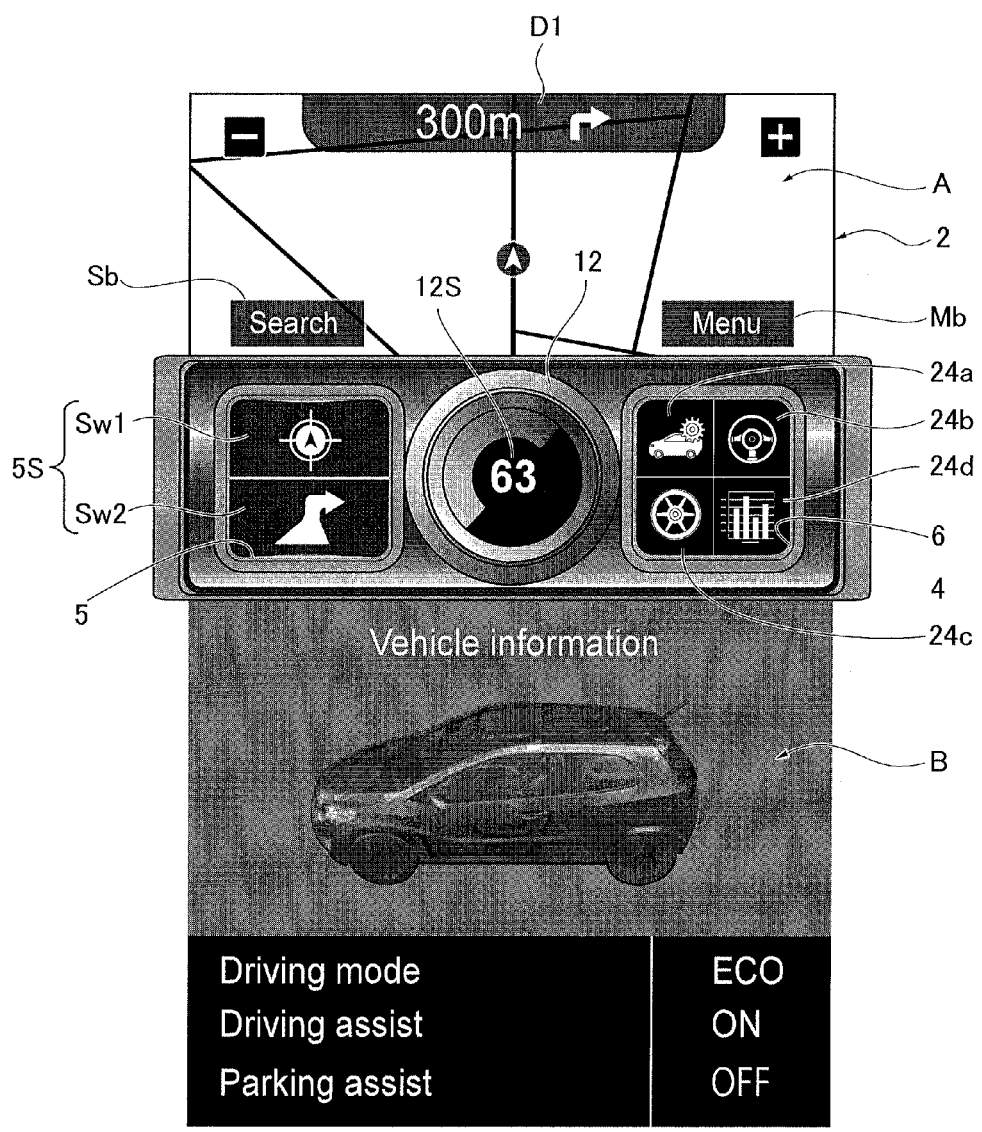
FIG. 15 is an explanatory view illustrating a screen in which vehicle information is indicated as content.

When the vehicle information button 24 shown in FIG. 9B is operated, the controller 14 controls the information display 2 to show vehicle information as the content B, as shown in FIG. 15.

Figure 16:
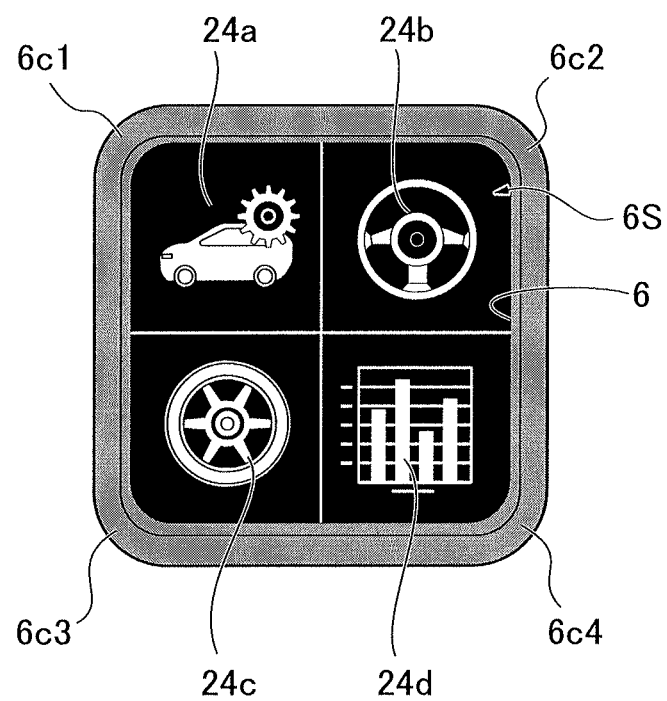
FIG. 16 is an enlarged view of the switch indicated in the switch indicator shown in FIG. 15.

In this case, the switch-indication field 6S includes a switch 24a to change the settings of the vehicle, a switch 24b to select a driving mode, a switch 24c to indicate information regarding the air-pressure values of tires, and a switch 24d to indicate driving information such as driving distance and fuel consumption. The switches 24a to 24d are distributed in quarter divisions in the switch-indication field 6S. As shown in FIG. 16, the switches 24a to 24d correspond to the corner sections 6C1, 6C2, 6C3, and 6C4 as a plurality of switch-confirmation portions.

As described above, the operation of selecting the switches 24a to 24d can be performed accurately and simply by a touch-operation of the corner sections 6C1, 6C2, 6C3 and 6C4.

(Climate Control Screen)

Figure 17:
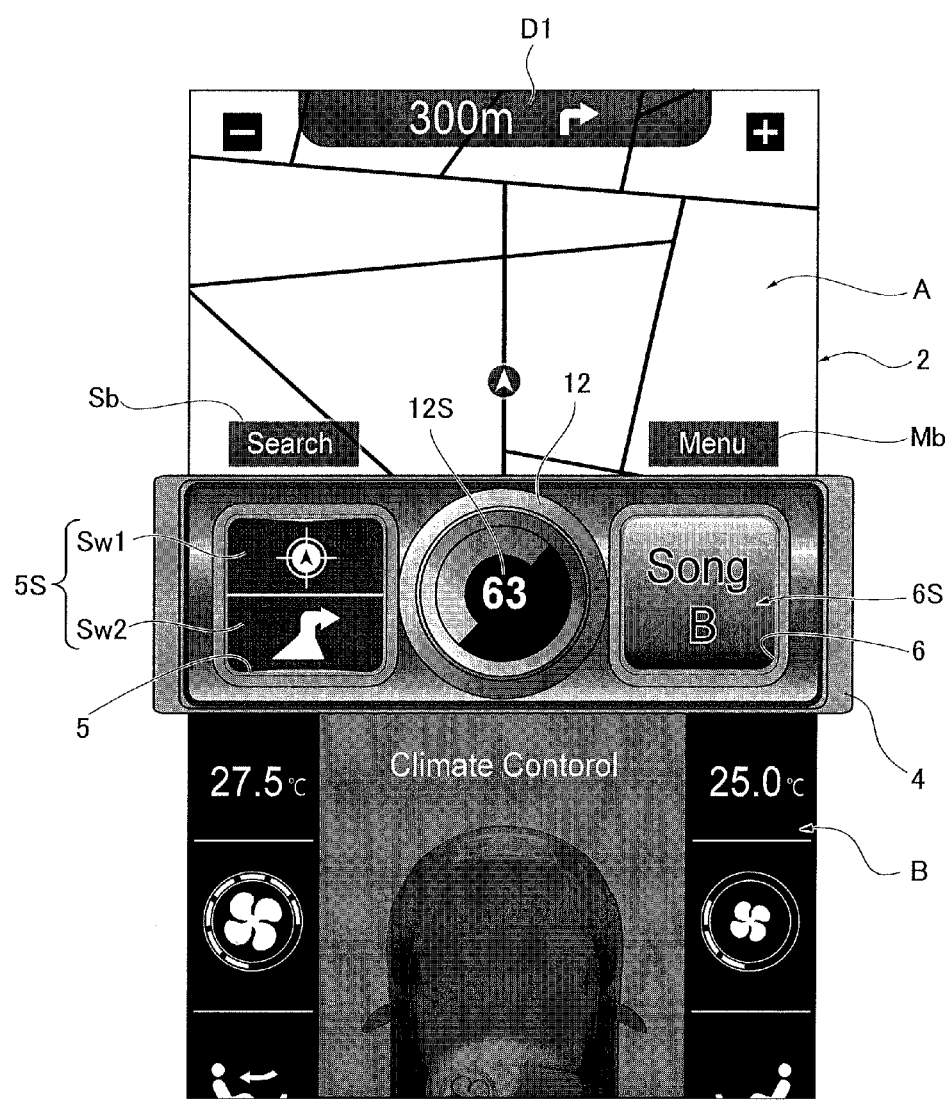
FIG. 17 is an explanatory view illustrating a screen in which climate-control information is indicated as content.

When the climate-control button 25 shown in FIG. 9B is operated, the controller 14 controls the information display 2 to show climate-control information as the content B, as shown in FIG. 17.

(Internet Browser Screen)

Figure 18:
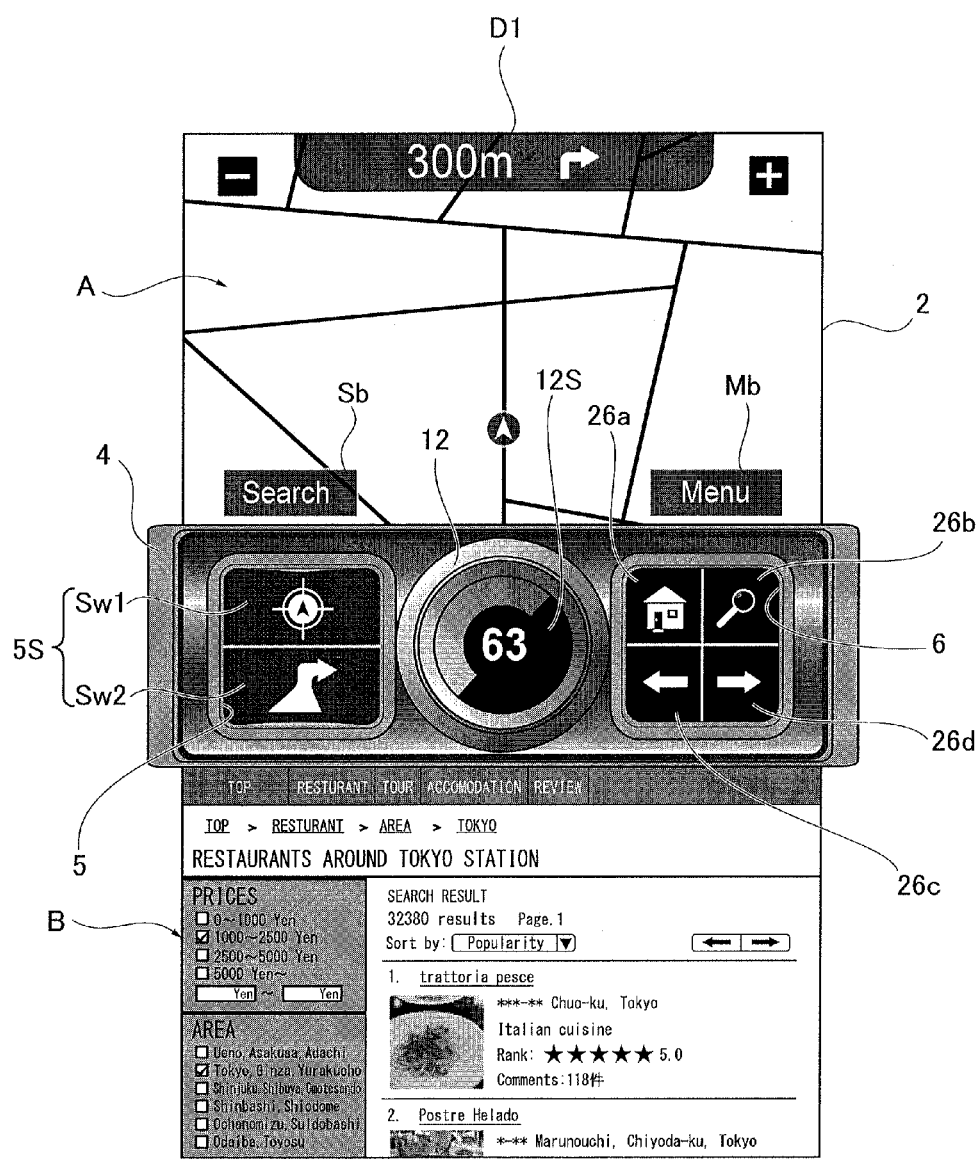
FIG. 18 is an explanatory view illustrating a screen in which Internet information is indicated as content.

When the Internet browser button 26 shown in FIG. 9B is operated, the controller 14 controls the information display 2 to show information about public facilities and so on which is generally used while driving as content B, as shown in FIG. 18. Such searchable Internet information includes information about dining places (restaurants and so on), travel guide information, accommodation, and so on. One of such Internet pages is set to be displayed as a homepage.

Figure 19:
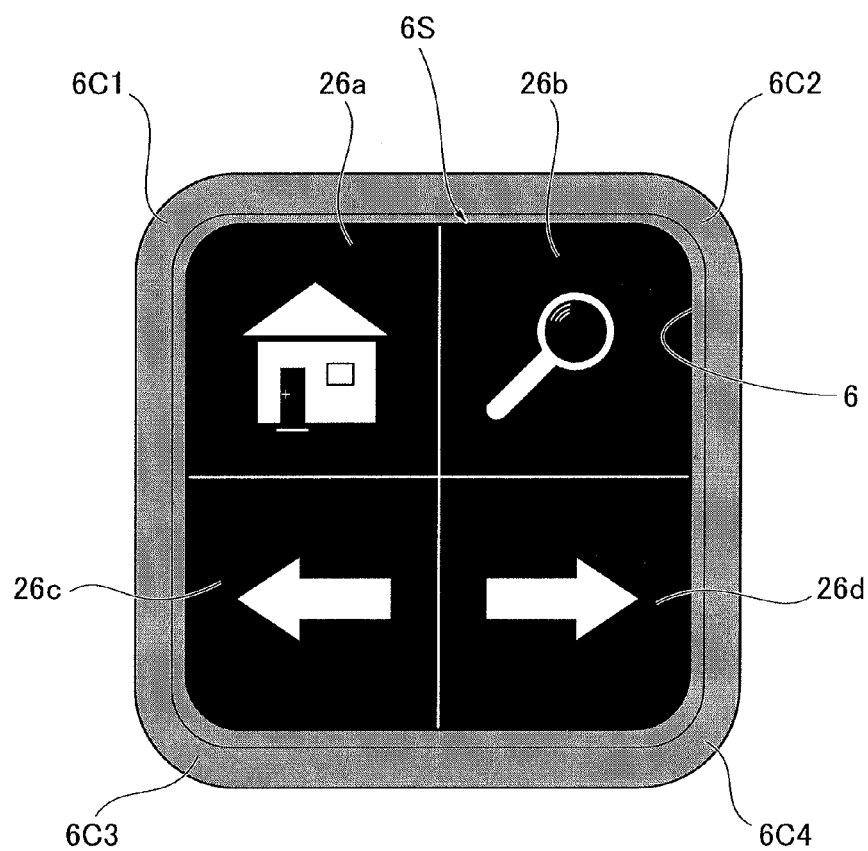
FIG. 19 is an enlarged view of the switch indicated in the switch indicator shown in FIG. 18.

In the above display condition, a switch 26a to indicate the homepage, switch 26b to execute an Internet search, and switches 26c and 26d which perform screen-transition so as to show the previous or next page are distributed in quarter divisions in the switch-indication field 6S. As shown in FIG. 19, the switches 26a to 26d correspond to the corner sections 6C1, 6C2, 6C3, and 6C4 as a plurality of touch-sensitive switch-confirmation portions.

As described above, the operation of selecting the switches 26a to 26d can be performed accurately and simply by a touch-operation of the corner sections 6C1, 6C2, 6C3, and 6C4. Herein, the switch 26b for the Internet-search is used to select a keyword of "restaurant", "travel guide", "accommodation", "review", and so on for the search. Every time the switch 26b is touch-operated, the screen indicated as the content B is changed to "restaurant", "travel guide", "accommodation", and "review", in this order. In FIG. 18, restaurant information is selected and indicated as the content B. When the switch 26c or 26d of "previous" and "next" is operated, the restaurant information screen of the content B is changed one by one page.

(Others)

In the case that the sliding plate 4 is moved along the information display 2, the information display 2 is controlled so as not to change the indications in the switch-indication fields 5S, 6S and the dial 12. Such an indication on the information display 2 is controlled by the controller 14 according to the detected position-signal output by the touch panel 3 through the position detectors 10 and 11. The display ranges of the contents A and B are changed by a moving operation of the sliding plate 4, so it is appropriate to move the sliding plate 4 in the lower direction in order to make the vehicle navigation map appear larger, and it is appropriate to move the sliding plate 4 in the upper direction in order to make the content B appear larger.

Embodiment 2

Figure 20:
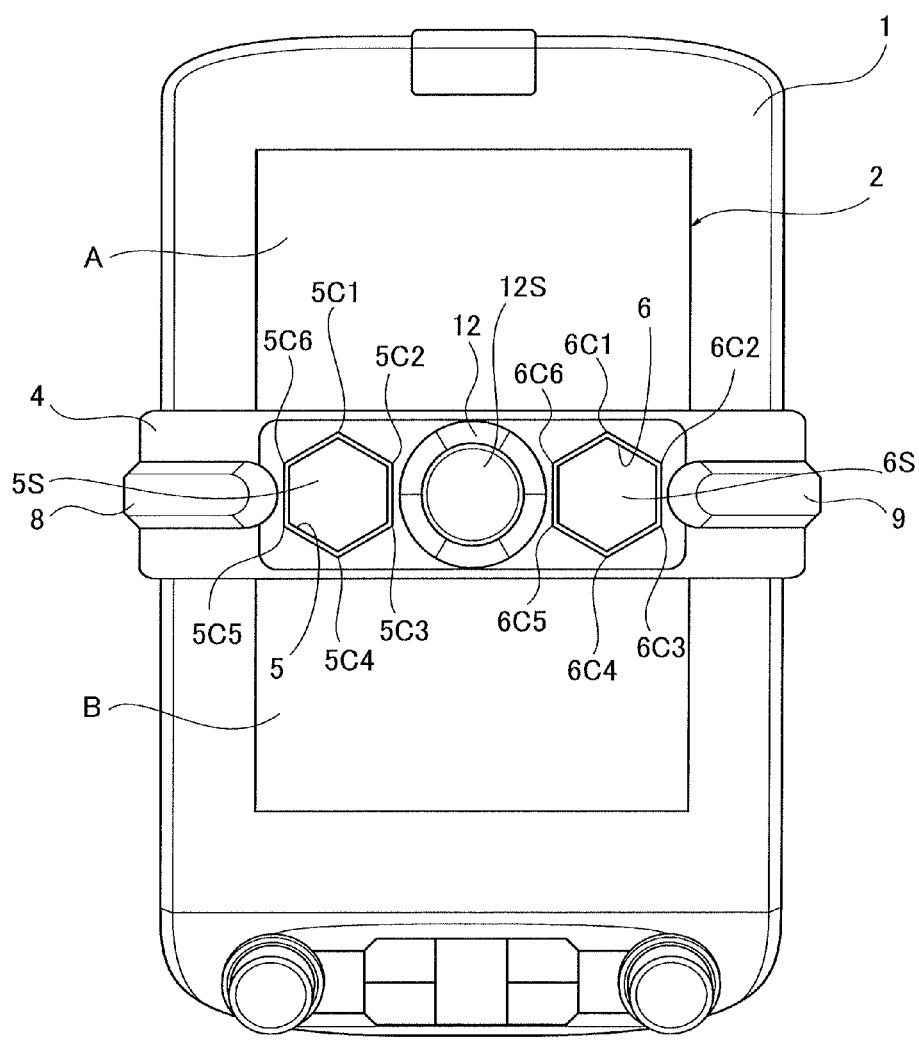
FIG. 20 is a front view of a touch-sensitive vehicle display device according to Embodiment 2 of the present invention.
Figure 21:
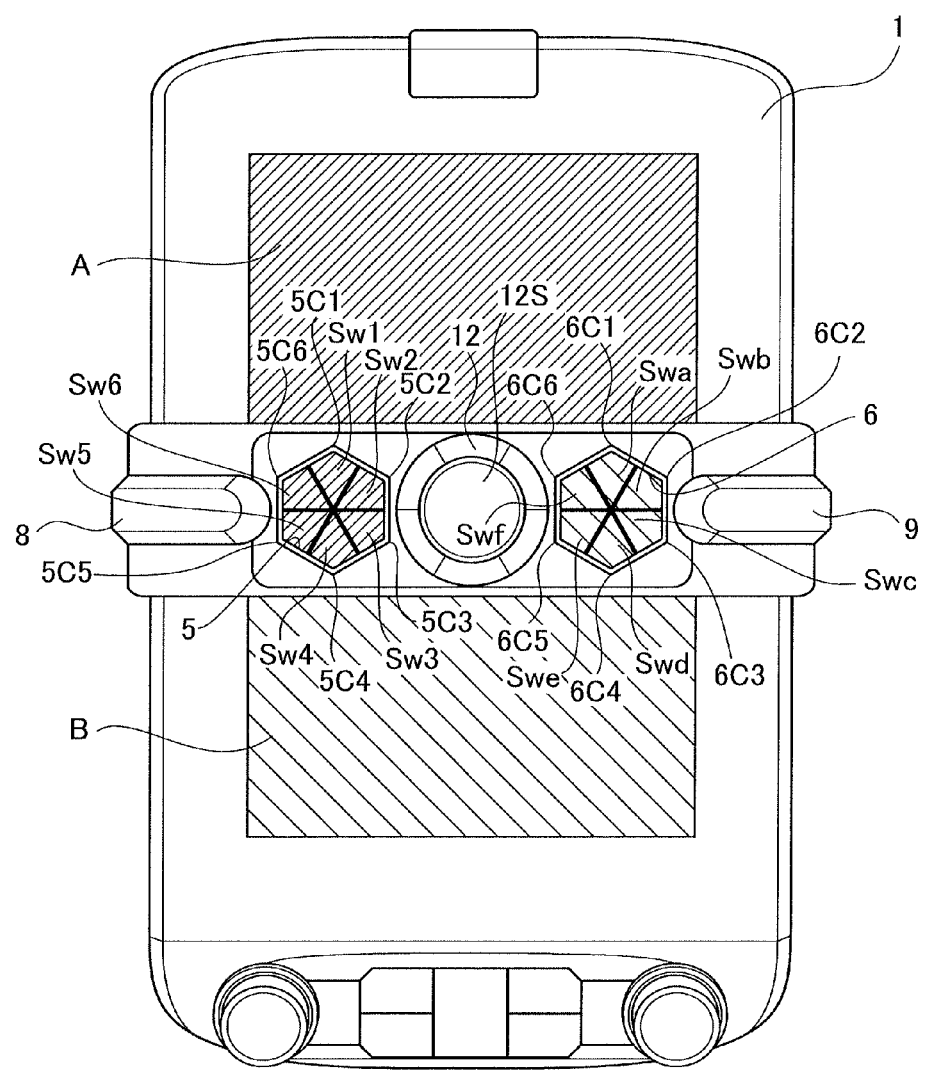
FIG. 21 is an explanatory view illustrating a selection switch indicated in a switch indicator of the touch-sensitive vehicle display device shown in FIG. 20.

According to above-described Embodiment 1, although the switch-indication fields 5S and 6S are described as having a square shape (polygonal shape), they are not limited to the above. For example, the switch-indication fields 5S and 6S can be formed in a hexagonal shape (polygonal shape), as shown in FIG. 20. In this instance, the corner sections 5C1 to 5C6, and corner sections 6C1 to 6C6 in the switch-indication fields 5S and 6S configure a plurality of touch-sensitive switch-confirmation portions. Accordingly, as shown in FIG. 21, six switches Sw1 to Sw6 can be indicated radially to correspond to the corner sections 5C1 to 5C6 in the switch-indication field 5S, and six switches Saw to Sfw can be indicated radially to correspond to the corner sections 6C1 to 6C6 in the switch-indication field 6S.

Similarly, in this instance, the operation of selecting the switches Sw1 to Sw6 can be performed accurately and simply by using the corner sections 5C1 to 5C6, and the operation of selecting the switches Saw to Sfw can be performed accurately and simply by using the corner sections 6C1 to 6C6.

Embodiment 3

Figure 22:
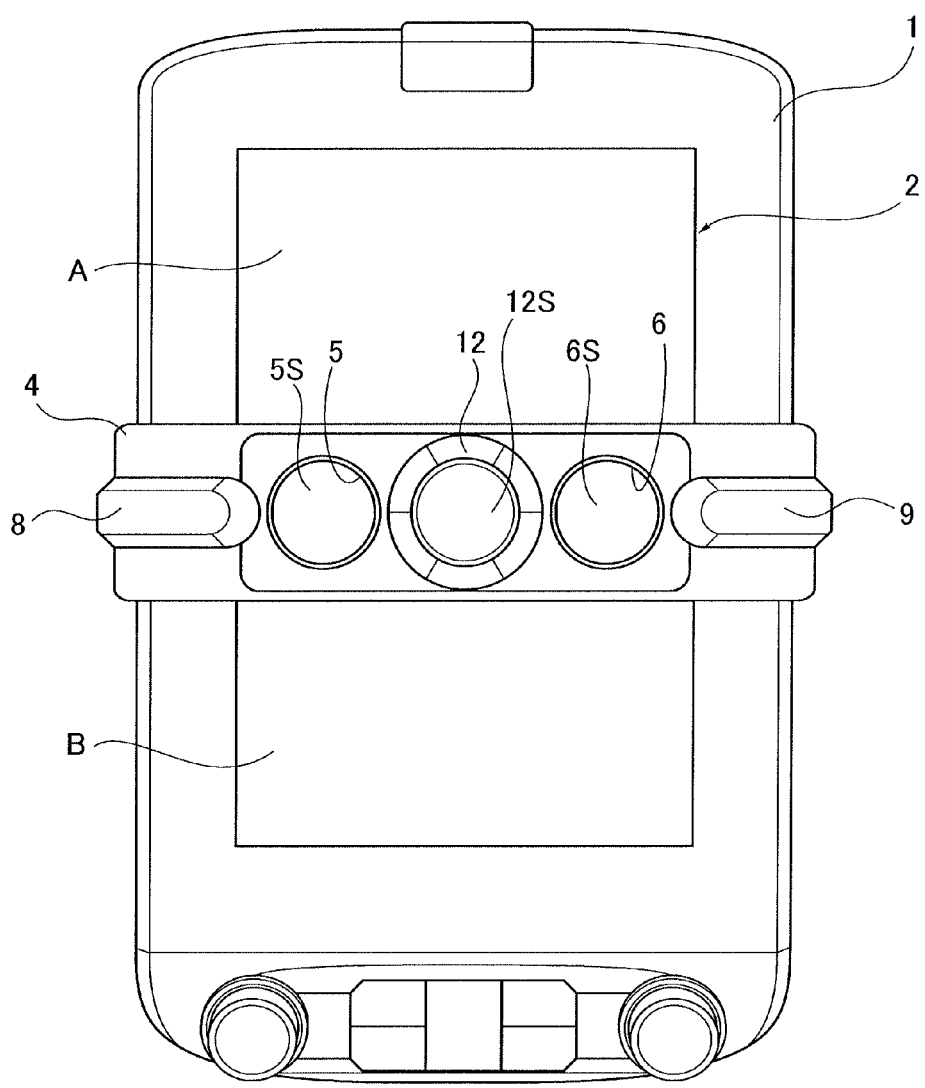
FIG. 22 is a front view of a touch-sensitive vehicle display device according to Embodiment 3 of the present invention.

The switch-indication fields 5S and 6S can be formed in a circular shape, as shown in FIG. 22.

The touch-sensitive vehicle display device according to the Embodiments of the present invention has the following features.

(1) The touch-sensitive vehicle display device according to the present embodiment comprises a body (case body 1) having a display (information display 2) including a touch panel 3 on a surface thereof, whereby a screen operation is performed on the surface of the display by a touch-screen operation; an operation plate (sliding plate 4) provided along the surface of the display (information display 2); and a controller 14 controlling information to be indicated on the display (information display 2). In addition, the operation plate (sliding plate 4) includes an opening section (5, 6) to indicate a switch provided to face the touch panel 3, and a plurality of touch-sensitive switch-confirmation portions (sides 5L1 to 5L4, corner portions 5C1 to 5C6 and 6C1 to 6C4) provided on an end portion of the opening section (5, 6) for switch indication. The controller 14 controls a switch-indication portion (5S, 6S) to be inside the opening section (5, 6) to indicate switching on the display (information display 2), and controls a plurality of selection-switches (Sw1 to Sw6, Swa to Swd) to be shown in the switch-indication portion (5S, 6S) to correspond to the plurality of switch-confirmation portions (sides 5L1 to 5L4, corner portions 5C1 to 5C6 and 6C1 to 6C4).

According to the above configuration, a plurality of selection switches (Sw1 to Sw6, Swa to Swd) can be selected by using a plurality of switch-confirmation portions (side sections 5L1 to 5L4, corner sections 5C1 to 5C6, and 6C1 to 6C6); therefore, the objective switch can be selected and operated accurately from a plurality of selection switches (Sw1 to Sw6, Swa to Swd) without looking at the display 2 even while driving.

(2) In the touch-sensitive vehicle display device according to the embodiments, the operation plate (sliding plate 4) is a sliding plate attached to the body (case body 1) so as to be movable along the surface of the display (information display 2), and includes a position detector (position detector 10, 11) which detects a position of the sliding plate 4, and the controller 14 controls information to be indicated on the display (information display 2) according to a detected signal from the position detector (position detector 10, 11).

According to the above configuration, the display range of content to be indicated on the display (information display 2) can be changed according to the position of the sliding plate 4.

(3) In the touch-sensitive vehicle display device according to the Embodiments, the opening section (5, 6) for switch indication is formed in a polygonal shape, and the switch-confirmation portions are included in a corner section (5C1 to 5C6, and 6C1 to 6C6) or a side section (5L1 to 5L4) of the opening section (5, 6) for switch indication.

According to the above configuration, a plurality of switch-confirmation portions and selection switches can be operated simply.

(4) In the touch-sensitive vehicle display device according to the Embodiments, a plurality of selection switches (Sw1, Sw2) are two selection switches indicated in the switch-indication field (5S) divided into two side to side or up and down, and the switch-confirmation portions are included in side sections (5L1, 5L3) of the opening (5) for switch-indication corresponding to the selection switches (Sw1, Sw2).

According to the above configuration, the selections switches (Sw1, Sw2) can be operated accurately by using their side sections (5L1, 5L3).

(5) In the touch-sensitive vehicle display device according to the Embodiments, the plurality of selection switches are four selection switches (Swa to Swd) indicated in the switch-indication field (6S) divided into four side-to-side and up-and-down configurations, and the switch-confirmation portions are included in corner sections (6C1 to 6C4) of the opening section (6) for switch-indication corresponding to the selection switches (Swa to Swd).

According to the above configuration, the selections switches (Swa to Swd) can be operated accurately and simply by using the corner sections (6C1 to 6C4).

(6) In the touch-sensitive vehicle display device according to the Embodiments, the selection switches (Sw1 to Sw6, Swa to Swd) are indicated in the switch-indication field (5S, 6S) divided radially from a center to an outer periphery of the opening section (5, 6) for switch-indication.

According to the above configuration, a number of selection switches can be indicated.

(7) In the touch-sensitive vehicle display device according to the Embodiments, the sliding plate 4 is composed of an electrical conductive material, and the position detectors (position detectors 10, 11) are provided in the sliding plate 4 and comprise a plurality of conductive contact regions contacting the touch screen surface and moving integrally with the sliding plate 4.

According to the above configuration, the position of the sliding plate 4 can be detected accurately because a plurality of position detectors 10 and 11 can be maintained in the same potential through the sliding plate.

According to the Embodiments of the present invention, a target switch can be selected accurately from a plurality of switches without paying attention to the display even while a vehicle is being driven.

Although the embodiments of the present invention have been described above, the present invention is not limited thereto. It should be appreciated that variations may be made in the embodiments described by persons skilled in the art without departing from the scope of the present invention.

What is claimed is:

1. A touch-sensitive vehicle display device, comprising:
    a body having a display including a touch panel on a surface thereof, whereby a screen operation is performed on the surface of the display by a touch-screen operation;
    an operation plate provided along the surface of the display; and
    a controller controlling information to be indicated on the display, wherein
    the operation plate includes an opening section to indicate a switch provided to face the touch panel, and a plurality of touch-sensitive switch-confirmation portions provided on an end portion of the opening section for switch indication, and
    the controller controls a switch-indication portion to be inside the opening section to indicate switching in the display, and controls a plurality of selection-switches to be shown in the switch-indication portion to correspond to the plurality of switch-confirmation portions.

2. The touch-sensitive vehicle display device according to claim 1, wherein
    the operation plate is a sliding plate attached to the body so as to be movable along the surface of the display, and includes a position detector which detects a position of the sliding plate, and
    the controller controls information to be indicated on the display according to a detected signal from the position detector.

3. The touch-sensitive vehicle display device according to claim 1, wherein
    the opening section for switch indication is formed in a polygonal shape, and the switch-confirmation portions are included in a corner section or a side section of the opening section for switch indication.

4. The touch-sensitive vehicle display device according to claim 1, wherein
    the plurality of selection switches are two selection switches indicated in the switch-indication field divided into two, and the switch-confirmation portions are included in side sections of the opening for switch-indication corresponding to the selection switches.

5. The touch-sensitive vehicle display device according to claim 1, wherein
    the plurality of selection switches are four selection switches indicated in the switch-indication field divided into four, and the switch-confirmation portions are included in corner sections of the opening section for switch-indication corresponding to the selection switches.

6. The touch-sensitive vehicle display device according to claim 1, wherein
    the selection switches are indicated in the radially divided switch-indication field of the opening section for switch-indication.

7. The touch-sensitive vehicle display device according to claim 1, wherein
    the sliding plate is composed of an electrical conductive material, and the position detectors are provided in the sliding plate and comprise a plurality of conductive contact regions contacting the touch screen surface and moving integrally with the sliding plate.

* * * * *